Patented Feb. 11, 1930

1,746,659

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

AZO DYESTUFFS AND PROCESS OF MAKING SAME

No Drawing. Application filed October 5, 1927, Serial No. 224,272, and in Germany October 15, 1926.

Our invention relates to new azo dyestuffs corresponding probably to the general formula:

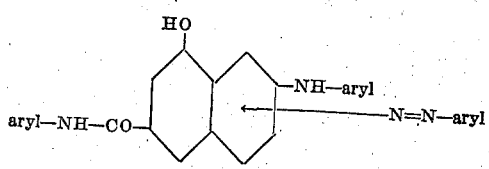

which are obtainable by combining a diazo compound with an arylide of a 2-arylamino-8-naphthol-6-carboxylic acid. (We cannot say in what position the azo group enters into the naphthalene nucleus.) Our new azo dyestuffs are when dry brown to blackish powders, being soluble in concentrated sulfuric acid with an olive color, dyeing, according to the character of the diazo component, wool reddish to black shades fast to milling, being suitable for the production of color lakes and dyeing, so far as they are water insoluble, cotton brown to olive to black shades fast to washing when produced on the fibre according to the ice color method.

The hitherto unknown arylides of 2-arylamino-8-naphthol-6-carboxylic acids may be prepared for instance in the following manner: 2.6-naphtholcarboxylic acid is sulfonated with concentrated sulfuric acid and the 8-sulfonic acid separated from the sulfonation mixture is transformed by the alkali fusion into 8-hydroxy-2-naphthol-6-carboxylic acid. By heating this compound with a primary arylamine in presence of a condensing agent the corresponding 2-arylamino-8-naphthol-6-carboxylic acid is obtained, which can be converted into its arylides by heating it together with an arylamine for instance with a dehydrating agent in an indifferent diluent according to U. S. A. Patent No. 1,101,111. Instead of 2.6-naphtholcarboxylic acid one may also start from 2-naphthylamine-6-carboxylic acid.

The anilide of 2-phenylamino-8-naphthol-6-carboxylic acid, for instance, forms an olive brown powder, which can not be recrystallized from the usual organic solvents. It decomposes at about 170° C. It is insoluble in benzene, soluble in spirit and glacial acetic acid.

The para-anisidide of 2-phenylamino-8-naphthol-6-carboxylic acid is an olive green powder, melting at about 160° C. while decomposing, soluble in spirit and glacial acetic acid, little soluble in benzene. We could not recrystallize it hitherto.

The β-naphthalide of 2-phenylamino-8-naphthol-6-carboxylic acid is obtained as yellowish green powder, melting at 170–175° C., insoluble in benzene, little soluble in spirit, well soluble in glacial acetic acid. We could not recrystallize it hitherto.

In order to further illustrate our invention the following examples are given, the parts being by weight and all temperatures in centigrade degrees, but it is understood, that our invention is not limited to the particular products or reacting conditions mentioned therein.

Example 1

Well boiled and dried cotton yarn is impregnated in the manner usual for the production of ice colors with a padding solution prepared as customary with addition of Turkey red oil or similar acting agents and containing 10 gms. of the anilide of 2-phenylamino-8-naphthol-6-carboxylic acid in the litre. It is developed, after having been dried, if desired, in a diazo solution containing a sufficient amount of acetic acid and 2,5 gms. of 3-chloroaniline in the litre, rinsed and soaped.

The dyestuff thus produced on the fibre corresponds probably to the formula:

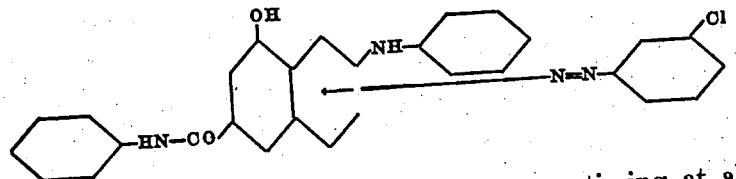

In this manner a dark olive shade of an excellent fastness is obtained.

The following table contains some further components as well as the shades of dyeings obtained by producing the azo dyestuffs on the vegetable fiber:

8-naphthol-6-carboxylic acid is mixed with an excess of acetic acid and while stirring at about 10° a diazo solution of 23,5 parts of the ammonium salt of para-nitraniline-ortho-sulfonic acid is allowed to run in, said diazo solution being prepared in the usual manner and most of its mineral acid being neu-

| Arylide of 2-phenylamino-8-naphthol-6-carboxylic acid | Diazo component of— | Shade |
|---|---|---|
| Anilide | 5-nitro-2-toluidine of the formula: 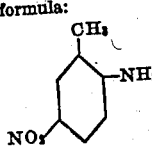 | Dark olive |
| Anilide | Orthoaminoazotoluene of the formula: 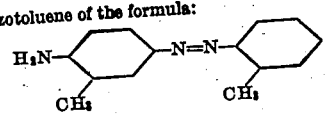 | Brownish-black |
| Anilide | Ortho-phenetol-azo-α-naphthylamine of the formula: 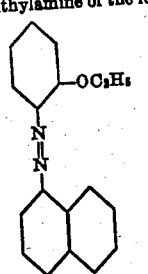 | Dark black |
| Para-anisidide | 4-chloro-2-toluidine of the formula: 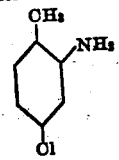 | Brown olive |
| Para-anisidide | 4-chloro-2-nitraniline of the formula: 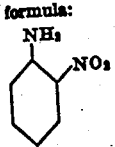 | Gray-brown |
| | | Reddish dark brown |
| Para-anisidide | 2.5-dichloroaniline | Black |
| Para-anisidide | Tetrazo component of 4.4'-diamino-diphenylamine | Bluish-black |
| β-naphthalide | Dianisidine | |

Example 2

A finely divided suspension of 35,4 parts of the anilide of 2-phenylamino-8-naphthol-6-carboxylic acid is mixed tralized by adding sodium acetate. When the combination is finished, the formed dyestuff, corresponding in the form of the free acid probably to the formula:

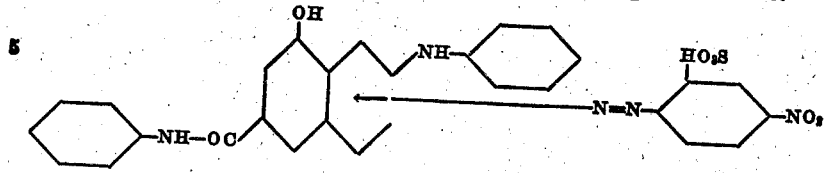

is isolated in the usual manner. It dyes wool dark brown shades of a remarkable fastness to milling. When afterchromed, the dyeings become fuller without changing the shade. A dyestuff dyeing wool similar shades is obtained when using the diazo compound of meta-amino-benzoic acid as diazo component.

In the same manner the process may be carried out with other arylides of the 2-aryl-amino-8-naphthol-6-carboxylic acids and other diazo compounds as for instance the diazo compounds of amino-hydroxyarylsulfonic or carboxylic acids.

Example 3

A tetrazo solution, prepared in the usual manner from 24.4 parts of dianisidine, is combined with a solution in dilute caustic soda solution of 80 parts of the β-naphthalide of 2-phenyl-amino-8-naphthol-6-carboxylic acid, containing a sufficient amount of sodium acetate for neutralizing the excess of mineral acid. The separated dyestuff corresponding probably to the formula:

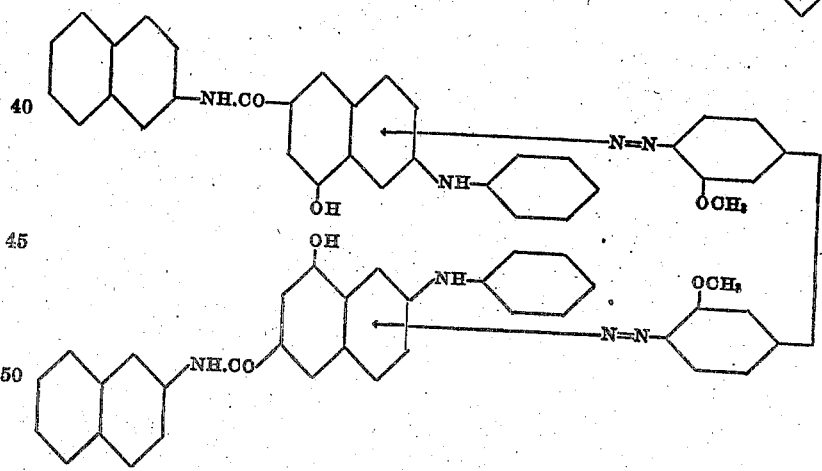

is filtered off and well washed. It dissolves in concentrated sulfuric acid with a brownish olive color. It may be advantageously used in form of a paste and yields, when mixed with the usual substrata, a black color lake of a good fastness.

In the following claims we wish it to be understood that the process of producing azo dyestuffs includes also the production upon a base, on a substratum suitable for the production of color lakes, as well as on the vegetable fibre.

We claim:
1. As new compounds the azo dyestuffs of the general formula:

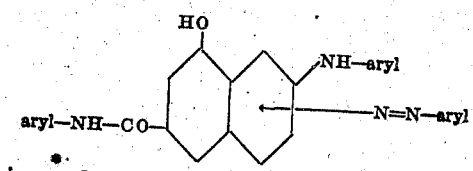

being, when dry, brown to blackish powders, soluble in concentrated sulfuric acid with an olive color.

2. The process which comprises combining a diazo compound with an arylide of a 2-aryl-amino-8-naphthol-6-carboxylic acid.

3. Fibrous materials dyed with the azo dyestuffs claimed in claim 1.

4. As new compounds the azo dyestuffs of the general formula:

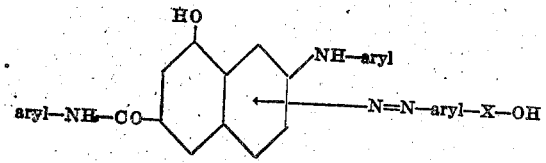

wherein X means $SO_2$ or CO, being, when dry, brown to blackish powders, soluble in concentrated sulfuric acid with an olive color and dyeing wool reddish to black shades which are fast to milling.

5. The process which comprises combining a diazo compound containing a sulfonic or carboxylic acid group with an arylide of a 2-arylamino-8-naphthol-6-carboxylic acid.

6. As new compounds the azo dyestuffs corresponding to the general formula:

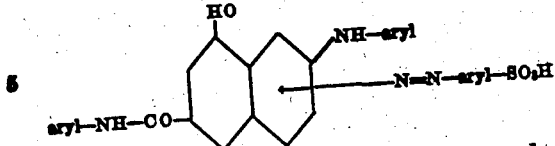

being, when dry, brown to blackish powders soluble in concentrated sulfuric acid with an olive color, and dyeing wool reddish to black shades which are fast to milling.

7. As new compounds the azo dyestuffs corresponding to the general formula:

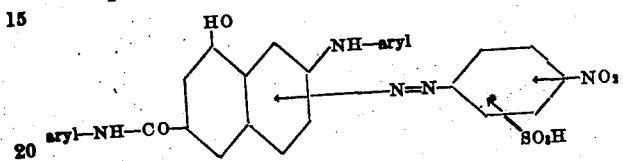

being, when dry, brown to blackish powders soluble in concentrated sulfuric acid with an olive color, and dyeing wool dark brown shades which are fast to milling.

8. The process which comprises combining a diazotized aminonitrobenzenesulfonic acid with an arylide of a 2-aryl-amino-8-naphthol-6-carboxylic acid.

In testimony whereof, we affix our signatures.

LEOPOLD LASKA.
ARTHUR ZITSCHER.